(12) United States Patent
Zhang et al.

(10) Patent No.: US 9,301,283 B2
(45) Date of Patent: *Mar. 29, 2016

(54) METHOD AND APPARATUS FOR ACCESSING AN UPLINK RANDOM ACCESS CHANNEL IN A SINGLE CARRIER FREQUENCY DIVISION MULTIPLE ACCESS SYSTEM

(71) Applicant: InterDigital Technology Corporation, Wilmington, DE (US)

(72) Inventors: Guodong Zhang, Syosset, NY (US); Allan Y. Tsai, Boonton, NJ (US); Kyle Jung-Lin Pan, Saint James, NY (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 181 days.

This patent is subject to a terminal disclaimer.

(21) Appl. No.: 13/963,487

(22) Filed: Aug. 9, 2013

(65) Prior Publication Data

US 2013/0322386 A1    Dec. 5, 2013

Related U.S. Application Data

(63) Continuation of application No. 13/192,890, filed on Jul. 28, 2011, now Pat. No. 8,565,212, which is a continuation of application No. 11/507,712, filed on Aug. 21, 2006, now abandoned.

(60) Provisional application No. 60/710,599, filed on Aug. 23, 2005.

(51) Int. Cl.
*H04W 72/04* (2009.01)
*H04W 52/48* (2009.01)
(Continued)

(52) U.S. Cl.
CPC .......... *H04W 72/0406* (2013.01); *H04L 1/188* (2013.01); *H04L 5/006* (2013.01);
(Continued)

(58) Field of Classification Search
None
See application file for complete search history.

(56) References Cited

U.S. PATENT DOCUMENTS 5,636,220 A    6/1997   Vook et al.
5,809,233 A    9/1998   Shur
(Continued)

FOREIGN PATENT DOCUMENTS

JP    08-502151    3/1996
JP    11-041197    2/1999
(Continued)

OTHER PUBLICATIONS

"JP 2001-237780 (Patent Abstracts of Japan)", English abstract, Aug. 31, 2001, 1 page.
(Continued)

*Primary Examiner* — Gary Mui
(74) *Attorney, Agent, or Firm* — Eric Berkowitz (57) ABSTRACT

A method and apparatus for accessing a contention-based uplink random access channel (RACH) in a single carrier frequency division multiple access (SC-FDMA) system are disclosed. A wireless transmit/receive unit (WTRU) randomly selects a RACH subchannel and a signature among a plurality of available RACH subchannels and signatures. The WTRU transmits a preamble using the selected signature via the selected RACH subchannel at a predetermined or computed transmission power. A base station monitors the RACH to detect the preamble and sends an acquisition indicator (AI) to the WTRU when a signature is detected on the RACH. When receiving a positive acknowledgement, the WTRU sends a message part to the base station. If receiving a negative acknowledgement or no response, the WTRU retransmits the preamble.

6 Claims, 5 Drawing Sheets (51) Int. Cl.
*H04W 52/50* (2009.01)
*H04W 74/08* (2009.01)
*H04L 1/18* (2006.01)
*H04L 5/00* (2006.01)
*H04L 5/02* (2006.01)
*H04L 27/26* (2006.01)
*H04W 8/26* (2009.01)
*H04W 52/08* (2009.01)
*H04W 52/14* (2009.01)
*H04W 52/16* (2009.01)
*H04W 72/02* (2009.01)
*H04W 74/00* (2009.01)

(52) U.S. Cl.
CPC ............ *H04L 5/0044* (2013.01); *H04W 52/48* (2013.01); *H04W 52/50* (2013.01); *H04W 74/0833* (2013.01); *H04L 5/0007* (2013.01); *H04L 5/023* (2013.01); *H04L 27/2602* (2013.01); *H04W 8/26* (2013.01); *H04W 52/08* (2013.01); *H04W 52/146* (2013.01); *H04W 52/16* (2013.01); *H04W 72/02* (2013.01); *H04W 72/042* (2013.01); *H04W 74/004* (2013.01)

(56) References Cited

U.S. PATENT DOCUMENTS

| | | | |
|---|---|---|---|
| 5,812,765 | A | 9/1998 | Curtis |
| 5,812,766 | A | 9/1998 | Osawa |
| 6,195,534 | B1 | 2/2001 | Sakoda |
| 6,388,997 | B1 | 5/2002 | Scott |
| 6,771,632 | B2 | 8/2004 | Dick et al. |
| 6,859,445 | B1 | 2/2005 | Moon et al. |
| 6,992,998 | B1 | 1/2006 | Bhatoolaul et al. |
| 7,103,060 | B2 | 9/2006 | Kornprobst et al. |
| 7,302,276 | B2 | 11/2007 | Bernhardsson et al. |
| 7,558,314 | B2 | 7/2009 | Jonsson |
| 2001/0024956 | A1 | 9/2001 | You et al. |
| 2001/0026539 | A1 | 10/2001 | Kornprobst et al. |
| 2002/0075839 | A1 | 6/2002 | Dick et al. |
| 2003/0026324 | A1 | 2/2003 | Li et al. |
| 2003/0045299 | A1 | 3/2003 | New |
| 2003/0133426 | A1 | 7/2003 | Schein et al. |
| 2003/0169681 | A1 | 9/2003 | Li et al. |
| 2003/0174668 | A1 | 9/2003 | Gessner et al. |
| 2004/0014452 | A1 | 1/2004 | Lim |
| 2004/0147274 | A1 | 7/2004 | Khawand et al. |
| 2004/0242181 | A1 | 12/2004 | Hepler et al. |
| 2004/0264497 | A1 | 12/2004 | Wang et al. |
| 2005/0003846 | A1 | 1/2005 | Anderson |
| 2005/0068967 | A1 | 3/2005 | Terry et al. |
| 2005/0232195 | A1 | 10/2005 | Jones |
| 2005/0271025 | A1* | 12/2005 | Guethaus et al. ............ 370/342 |
| 2006/0018289 | A1 | 1/2006 | Schulist et al. |
| 2006/0203950 | A1* | 9/2006 | Chung et al. .................. 375/376 |
| 2006/0215617 | A1* | 9/2006 | Martin .......................... 370/337 |
| 2008/0102875 | A1 | 5/2008 | Shoji |
| 2008/0247337 | A1* | 10/2008 | Li et al. ........................ 370/280 |

FOREIGN PATENT DOCUMENTS

| | | |
|---|---|---|
| JP | 2002-539667 | 9/2000 |
| JP | 2003-507957 | 3/2001 |
| JP | 2001-237780 | 8/2001 |
| JP | 2003-524985 | 8/2001 |
| JP | 2001-298770 | 10/2001 |
| JP | 2002-528997 | 9/2002 |
| JP | 2002-539736 | 11/2002 |
| JP | 2003-179576 | 6/2003 |
| JP | 2003-319452 | 11/2003 |
| JP | 2004-088207 | 3/2004 |
| JP | 2006-501769 | 4/2004 |
| JP | 2007-509531 | 4/2005 |
| JP | 2005-198353 | 7/2005 |
| JP | 2006-500804 | 1/2006 |
| KR | 102000001384 | A | 3/2000 |
| KR | 2001-15234 | 2/2001 |
| KR | 10-0360250 | 11/2002 |
| TW | 200419969 | 10/2004 |
| TW | 200518502 | 6/2005 |
| WO | WO-00/25443 A1 | 5/2000 |
| WO | WO-00/54424 | 9/2000 |
| WO | WO-00/56096 A1 | 9/2000 |
| WO | WO-01/15340 | 3/2001 |
| WO | WO-01/63775 | 8/2001 |
| WO | WO-2004/028019 A1 | 4/2004 |
| WO | WO-2004/030392 A1 | 4/2004 |
| WO | WO-2004/032381 | 4/2004 |
| WO | WO-2004/032559 | 4/2004 |
| WO | WO-2004/039027 | 5/2004 |
| WO | WO-2005/039128 | 4/2005 |

OTHER PUBLICATIONS

"Japan Office Action", Japan Application No. 2013-197303, Jul. 8, 2014, 3 pages.
"Japan Office Action English Translation", Japan Application No. 2013-197303, Jul. 8, 2014, 3 pages.
"Japanese Reexamination Report (English Translation)", Japanese Patent Application No. 2011-132350, Jun. 2, 2014, 4 Pages.
"Taiwanese Office Action (English Translation)", Taiwanese Application No. 102120605, Oct. 30, 2014, 6 Pages.
"Taiwanese Office Action", Taiwanese Application No. 102120605, Oct. 30, 2014, 10 Pages.
"3rd Generation Partnership Project: Technical Specification Group Radio Access Network Physical Layer Aspects for Evolved UTRA", 3GPP TR 25.814 V0.1.2, Jun. 2005, 29 Pages.
"Canadian Office Action", dated Jan. 23, 2012, Canadian Application No. 2,620,234, 2 pages.
"Final Rejection", dated Dec. 17, 2009, U.S. Appl. No. 11/507,712, 29 pages.
"International Search Report", dated Sep. 25, 2007, PCT/US 06/32623, 2 pages.
"Japanese Notice of Rejection", dated Apr. 23, 2013, Application No. 2011-132350, 3 Pages.
"Japanese Notice of Rejection (English Translation)", dated Apr. 23, 2013, Application No. 2011-132350, 3 Pages.
"Japanese Official Notice of Rejection", Dated Oct. 15, 2010, Japanese Patent Application No. 2008-528044, 3 pages.
"Japanese Official Notice of Rejection (English Translation)", dated Oct. 15, 2010, Japanese Patent Application No. 2008-528044, 3 pages.
"Korean Notice of Decision to Patent and Translation", dated Dec. 27, 2011, Application No. 10-2008-7007424, 4 pages.
"Korean Office Action", dated Feb. 5, 2010, Korean Patent Application No. 10-2008-7006905, 5 pages.
"Korean Office Action (English Translation)", dated Feb. 5, 2010, Korean Patent Application No. 10-2008-7006905, 6 pages.
"Non-Final Rejection", dated Jul. 31, 2009, U.S. Appl. No. 11/507,712, 26 pages.
"Taiwan Examination Notification", dated Jul. 2, 2013, Taiwan Patent Application No. 095130889, 3 Pages.
"Taiwan Examination Notification (English Translation)", dated Jul. 2, 2013, Taiwan Patent Application No. 095130889, 2 Pages.
"Taiwanese Notification for Examination", dated Sep. 18, 2012, Taiwan Patent Application No. 095130889, 16 pages.
"Taiwanese Notification for Examination (English Translation)", dated Sep. 18, 2012, Taiwan Patent Application No. 095130889, 11 pages.
"Technical Specification Group Radio Access Network; Physical Channels and Mapping of Transport Channels onto Physical Channels (FDD)", 3GPP TS 25.211 V6.5.0, Jun. 2005, 49 pages.
"Technical Specification Group Radio Access Network; Physical Layer Aspects for Evolved UTRA (Release 7)", 3GPP TR 25.814 V0.1.1, Jun. 2005, 30 pages.
"Japanese Notice of Rejection", Japanese Application No. 2013-058657, Nov. 4, 2014, 4 pages.

(56) References Cited

OTHER PUBLICATIONS

"Japanese Notice of Rejection (English Translation)", Japanese Application No. 2013-058657, Nov. 4, 2014, 5 pages.
"Patent Abstract of JP2004-088207", Mar. 18, 2004, 2 pages.
"Presentation of Specification to TSG RAN WG1 adhoc on LTE", 3GPP Tdoc R1-050682; 3GPP TSG-RAN WG1 adhoc; Sophia Antipolis, France, Jun. 20-21, 2005, 31 pages.
"Japanese Notice of Allowance", Japanese Application No. 2015-002487, Jan. 5, 2016, 4 pages.
Ericsson, "Contents of RRC Connection Request", 3GPP TSGR2#4(99)415; R2-99415; Meeting #4; TSG-RAN Working Group 2 (Radio layer 2 and Radio layer 3), Berlin, Germany, May 25-28, 1999, 4 pages.

* cited by examiner

METHOD AND APPARATUS FOR ACCESSING AN UPLINK RANDOM ACCESS CHANNEL IN A SINGLE CARRIER FREQUENCY DIVISION MULTIPLE ACCESS SYSTEM

CROSS REFERENCE TO RELATED APPLICATIONS

This application is a continuation of U.S. patent application Ser. No. 13/192,890 filed Jul. 28, 2011, which is a continuation of U.S. patent application Ser. No. 11/507,712 filed Aug. 21, 2006, which claims the benefit of U.S. Provisional Application Ser. No. 60/710,599, filed Aug. 23, 2005, the contents of which are hereby incorporated by reference herein.

FIELD OF THE INVENTION

The present invention is related to wireless communication systems. More particularly, the present invention is related to a method and apparatus for accessing a contention-based uplink random access channel (RACH) in a single carrier frequency division multiple access (SC-FDMA) system.

BACKGROUND

The third generation partnership project (3GPP) and 3GPP2 are currently considering a long term evolution (LTE) of the universal mobile telecommunication system (UMTS) terrestrial radio access (UTRA). Currently, SC-FDMA has been adopted for the uplink air interface of the evolved UTRA.

In an SC-FDMA system, a plurality of orthogonal subcarriers are transmitted simultaneously. The subcarriers are divided into a plurality of subcarrier blocks, (also known as resource blocks (RBs)). A block of subcarriers is a basic resource unit in an SC-FDMA system. The subcarrier block may be either a localized subcarrier block or a distributed subcarrier block. The localized subcarrier block is a set of consecutive subcarriers and the distributed subcarrier block is a set of equally spaced non-consecutive subcarriers.

Figure 1:
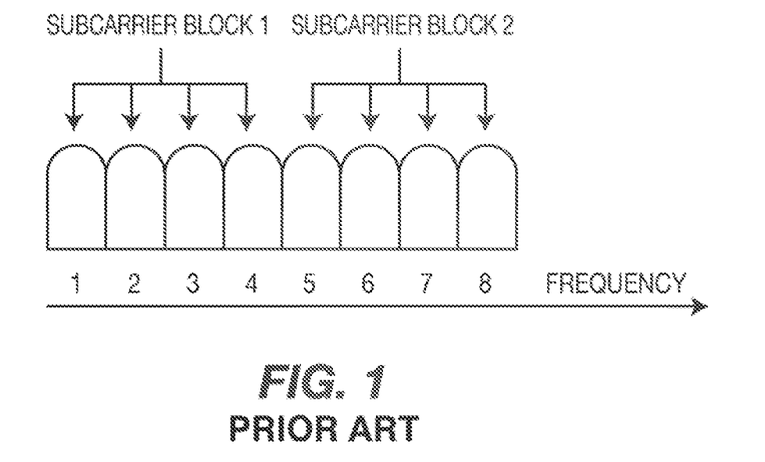
FIG. 1 shows a conventional localized subcarrier block for SC-FDMA.
Figure 2:
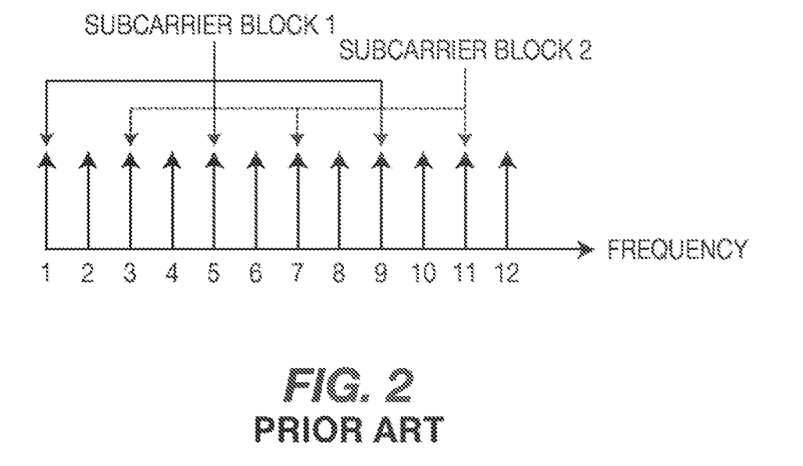
FIG. 2 shows a conventional distributed subcarrier block for SC-FDMA.

FIG. 1 illustrates two localized subcarrier blocks, each comprising four consecutive subcarriers. The localized subcarrier block is a basic scheduling unit for uplink transmissions in a localized-mode SC-FDMA system. FIG. 2 illustrates two distributed subcarrier blocks. In this example, the distributed subcarrier block 1 includes subcarriers 1, 5 and 9, and the distributed subcarrier block 2 includes subcarriers 3, 7 and 11. The distributed subcarrier block is a basic scheduling unit for uplink transmissions in a distributed-mode SC-FDMA system. Depending on a data rate or a buffer status, a Node-B assigns at least one subcarrier block for uplink transmissions for a wireless transmit/receive unit (WTRU).

When a WTRU transitions from an idle mode to a connected mode, the WTRU needs to communicate with a base station (or a network) using a RACH, which is a contention-based channel. The RACH transmissions of the WTRU have two parts: a preamble part and a message part. In a conventional wideband code division multiple access (WCDMA) system, (up to Release 6), a transmit power ramping up scheme is used for accessing the RACH. The WTRU starts transmission of a preamble to a base station with a very low (or minimum) initial transmit power level. If the preamble is successfully decoded by the base station, the base station sends a positive acknowledgement (ACK) to the WTRU via an acquisition indicator channel (AICH). If the base station fails to decode the preamble, the base station sends a negative acknowledgement (NACK). When the WTRU receives a NACK or no response, the WTRU retransmits the preamble while ramping up the transmit power level in subsequent transmission time intervals (TTIs).

This power ramp up process which starts with a low or minimum power causes an extra delay for uplink random access which is undesirable.

SUMMARY

The present invention is related to a method and apparatus for accessing a contention-based uplink RACH in an SC-FDMA system. A WTRU randomly selects a RACH subchannel and a signature among a plurality of available RACH subchannels and signatures. The WTRU transmits a preamble using the selected signature via the selected RACH subchannel at a predetermined transmission power. A base station monitors the RACH subchannels to detect the preamble. The base station sends an acquisition indicator (AI) to the WTRU when a signature is detected on the RACH. When the WTRU receives an ACK, the WTRU sends a random access message to the base station. If the WTRU receives a NACK or no response, the WTRU retransmits the preamble. The base station may send a power adjustment for the message part and/or timing and frequency correction.

DETAILED DESCRIPTION

When referred to hereafter, the terminology "WTRU" includes but is not limited to a user equipment (UE), a mobile station (STA), a fixed or mobile subscriber unit, a pager, or any other type of device capable of operating in a wireless environment. When referred to hereafter, the terminology "base station" includes but is not limited to a Node-B, a site controller, an access point (AP) or any other type of interfacing device in a wireless environment.

The features of the present invention may be incorporated into an integrated circuit (IC) or be configured in a circuit comprising a multitude of interconnecting components.

Figures 3, 3A:
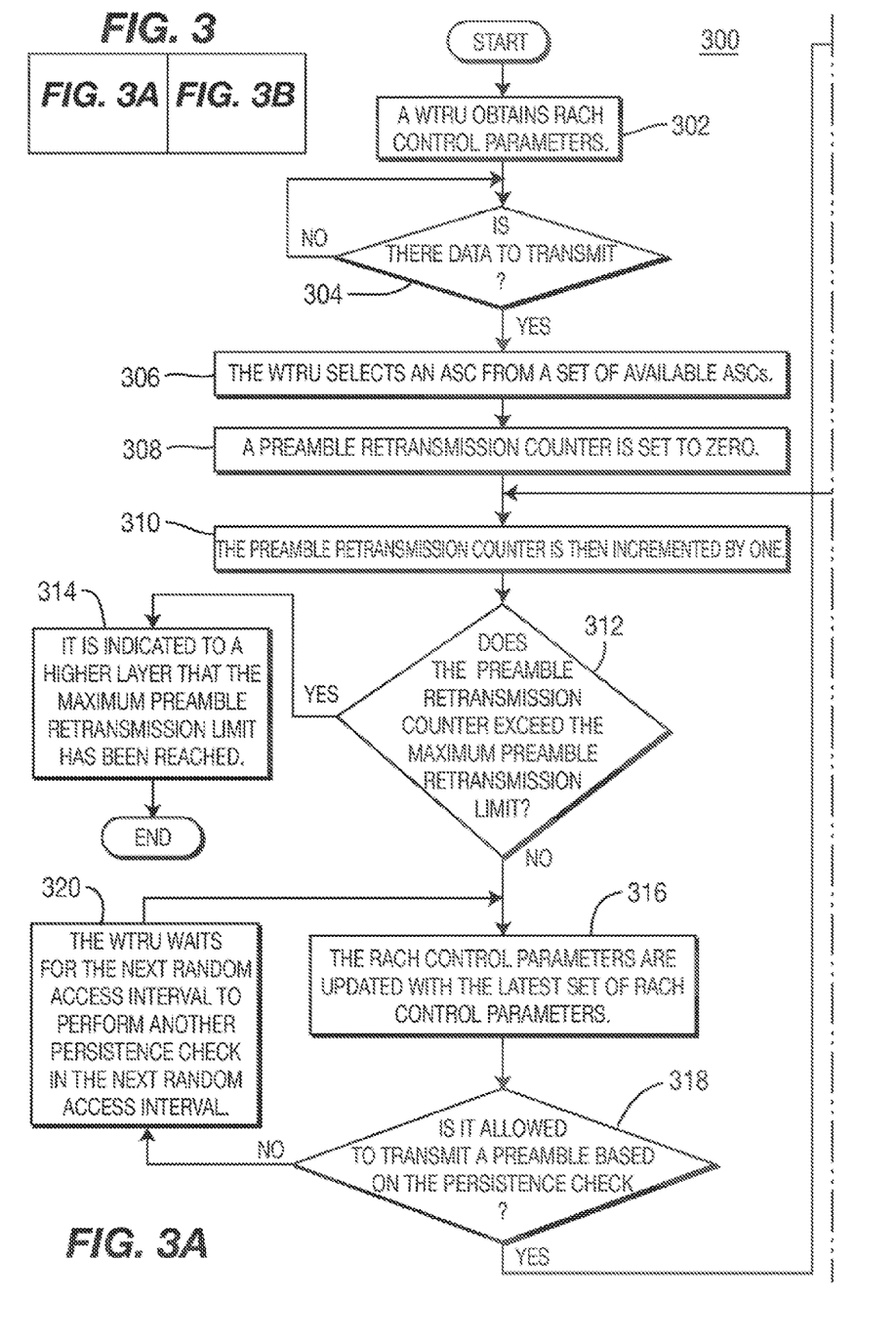
FIGS. 3A and 3B are a flow diagram of a process for accessing a contention-based RACH in an SC-FDMA system in accordance with the present invention.
Figure 3B:
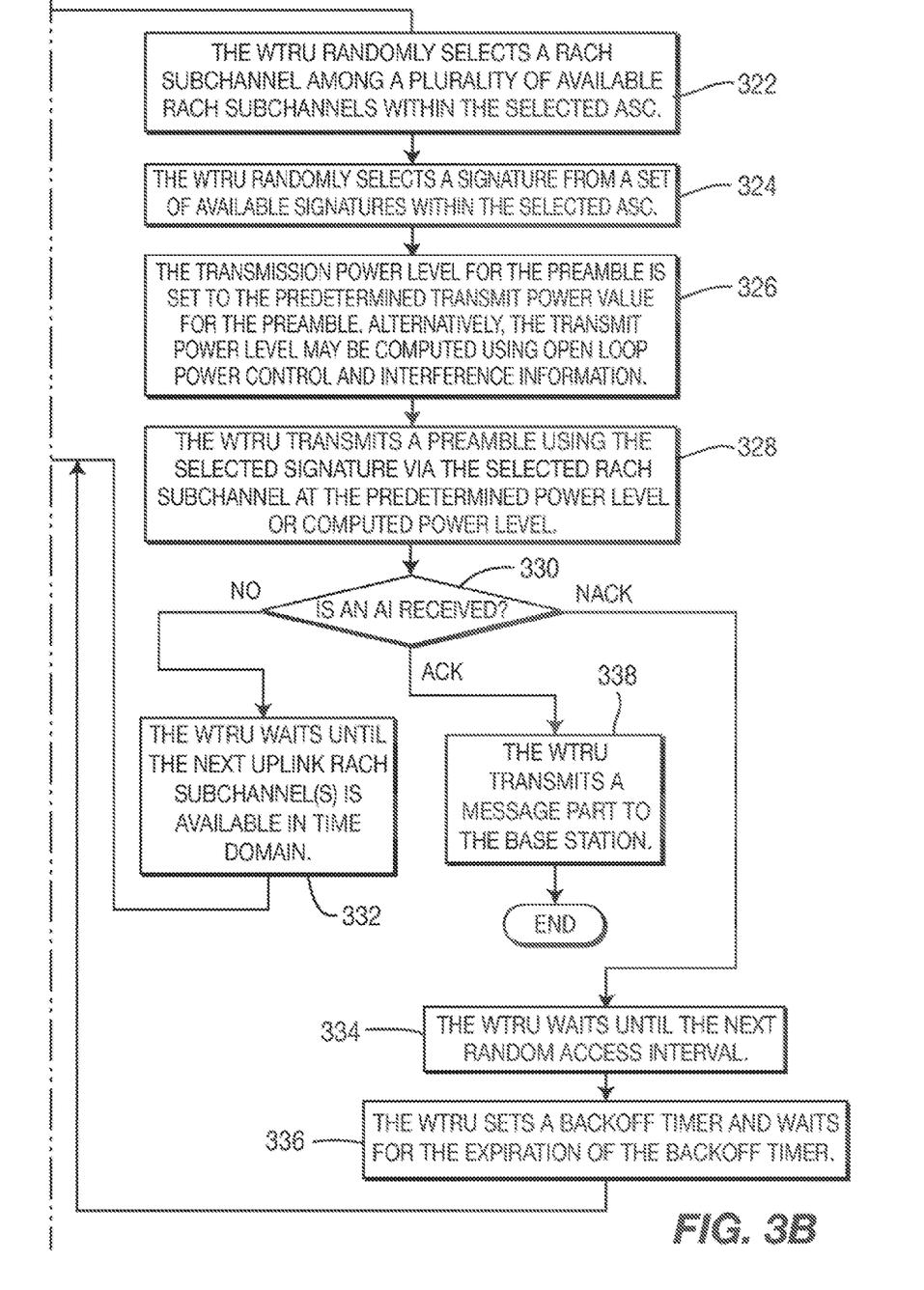

FIGS. 3A and 3B are a flow diagram of a process 300 for accessing a contention-based RACH in an SC-FDMA system in accordance with the present invention. After performing a cell search successfully, a WTRU obtains RACH control parameters (step 302). The RACH control parameters include at least one of, but are not limited to:

1) Predetermined transmit power for the preamble (optional) or uplink interference level at the Node B, which helps the WTRU to determine the transmit power of the preamble;
2) Persistence level of transmission on the RACH;
3) Preamble scrambling code;

4) Message length (optional) in time, frequency, or both;

5) AICH transmission timing parameter;

6) A set of available signatures and a set of available RACH subchannels for each of a plurality of access service classes (ASCs);

7) Maximum preamble retransmission limit;

8) Power offset $P_{p-m}$, (optional), measured in dB, between the power of the control part of the random access message and the power of the rest of the random access message;

9) A set of transport format parameters, including a power offset between the data part and the control part of the random access message for each transport format; and 10) A one-to-one mapping relation of the time and frequency locations between the RACH and the AICH.

The RACH may be defined by at least one subcarrier, (or at least one subcarrier block), over at least one time slot. Alternatively, the RACH may be defined by at least one subcarrier, (or at least one subcarrier block), over at least one time slot with at least one spreading code. If the RACH is defined with several subcarriers, the subcarriers may be either consecutive or equally-spaced. Similarly, if the RACH is defined with several subcarrier blocks, the subcarrier blocks may be localized subcarrier blocks or distributed subcarrier blocks. Consecutive subcarriers and localized subcarrier blocks are preferred over equally-spaced subcarriers and distributed subcarrier blocks because of less ambiguity in timing detection at the receiver, (e.g., the Node B).

When it is determined at step 304 that there is data to be transmitted, the WTRU selects an ASC from a set of available ASCs (step 306). Each ASC is associated with an identifier i of RACH subchannel set and a persistence value $P_i$.

A preamble retransmission counter is set to zero (step 308). The preamble retransmission counter is then incremented by one before initiating a transmission of a preamble (step 310). It is determined whether the preamble retransmission counter exceeds the maximum preamble retransmission limit (step 312). If the retransmission counter exceeds the maximum preamble retransmission limit, it is indicated to a higher layer that the maximum preamble retransmission limit has been reached (step 314), and the process 300 ends.

If the retransmission counter does not exceed the maximum preamble retransmission limit, the WTRU checks whether any new RACH control parameters have been received, and if so, the RACH control parameters are updated with the latest set of RACH control parameters (step 316).

The WTRU then performs a persistence check to determine whether it is allowed to transmit a preamble based on the persistence check (step 318). Based on the persistence value $P_i$, the WTRU determines whether to start the preamble transmission procedure in a current random access interval. The duration of the random access interval is a design parameter, and may be a single TTI, multiple TTIs or a fraction of a TTI. If the transmission of the preamble is not allowed based on the persistence check, the WTRU waits for the next random access interval to perform another persistence check in the next random access interval (step 320). The persistency check is repeated until transmission is permitted. If the transmission of the preamble is allowed based on the persistence check, the random access procedure is initiated (steps 322-328).

The WTRU randomly selects a RACH subchannel among a plurality of available RACH subchannels within the selected ASC (step 322). The WTRU randomly selects a signature from a set of available signatures within the selected ASC (step 324). The random functions for selecting the RACH subchannel and the signature shall be such that each of the allowed selections is chosen with an equal probability.

The transmission power level for the preamble is set to the predetermined transmit power value for the preamble (step 326). Alternatively, the transmission power level for the preamble may be computed using open loop power control and interference information sent on a broadcast channel (BCH) from the cell (optional). The predetermined value may be set large enough to ensure that the signal-to-noise ratio (SNR) at the base station meets the predefined threshold in order for the base station to successfully decode the preamble. Due to the SC-FDMA structure, the large transmit power of the preamble is limited to the subcarrier(s), (or subcarrier block(s)), used by the RACH only and does not affect other subcarriers or subcarrier blocks in the same cell. In a conventional WCDMA system, the initial transmit power of the preamble is set to a very low level and incrementally ramped up each time the preamble is retransmitted. This causes a significant delay until the preamble is detected by the base station. In contrast, in accordance with the present invention, since the preamble is transmitted at a sufficiently high transmission power level, and the RACH subchannel and signature are selected randomly, such delay is eliminated or reduced.

The WTRU then transmits a preamble using the selected signature via the selected RACH subchannel at the predetermined or computed power level (step 328). After transmitting the preamble, the WTRU monitors an AICH to detect an AI sent by the base station in response to the preamble (step 330). The AICH is a fixed rate physical channel used to carry AIs. The AICH may be spread over several subcarriers to have frequency diversity and make it more reliable. An AICH may be multiplexed with the downlink shared control channel. An AI corresponds to a signature on the RACH. There is unique and fixed one-to-one mapping relation of the time and frequency locations between the RACH and the AICH. With the signature and the fixed one-to-one mapping relation, the WTRU determines which AI is a response to its random access.

If no AI is detected on the AICH, the WTRU waits until the next uplink RACH sub-channel(s) is available in time domain (step 332), and the process 300 returns to step 310 to retransmit the preamble. During the retransmission of the preamble, the transmit power level of the preamble may or may not be ramped up.

If it is determined at step 330 that a NACK is detected on the AICH, the WTRU waits until the next random access interval (step 334). The WTRU then sets a backoff timer and waits for the expiration of the backoff timer (step 336). The backoff timer is preferably set to an integer multiple of 10 ms, which is randomly selected between minimum and maximum backoff periods. The minimum and maximum backoff periods may be set equal when a fixed delay is desired. The minimum and maximum backoff periods may be set to zero when no delay other than the one due to persistency is desired. After expiration of the backoff timer, the process 300 returns to step 310 to retransmit the preamble. During the retransmission of the preamble, the preamble transmission power level may or may not be ramped up.

If it is determined at step 330 that an ACK is detected on the AICH, the WTRU transmits a message part to the base station (step 338). The message part contains information that a user wants to send to the base station. The information in the message part may include at least one of, but not limited to:

1) Scheduling information, such as WTRU identity, data (traffic) type, data size, quality of service (QoS) information, and WTRU transmission power;

2) Small amount of traffic data (optional);

3) Layer 3 control message;

4) Uplink pilot signals; and

5) Transport format indicator (TFI) of the transmitted message.

In transmitting the message part, the WTRU may adjust the transmit power of the message part and timing and frequency according to a power adjustment and a timing and frequency correction, respectively, which are generated by the base station, which will be explained with reference to FIG. 4 hereinafter. The message part is transmitted N uplink access slots after the uplink access slot of the last transmitted preamble depending on the AICH transmission timing parameter. Transmission power of the control part of the message part should be $P_{p-m}$ dB higher than the transmit power of the last transmitted preamble. Both N and $P_{p-m}$ are design parameters.

Figure 4:
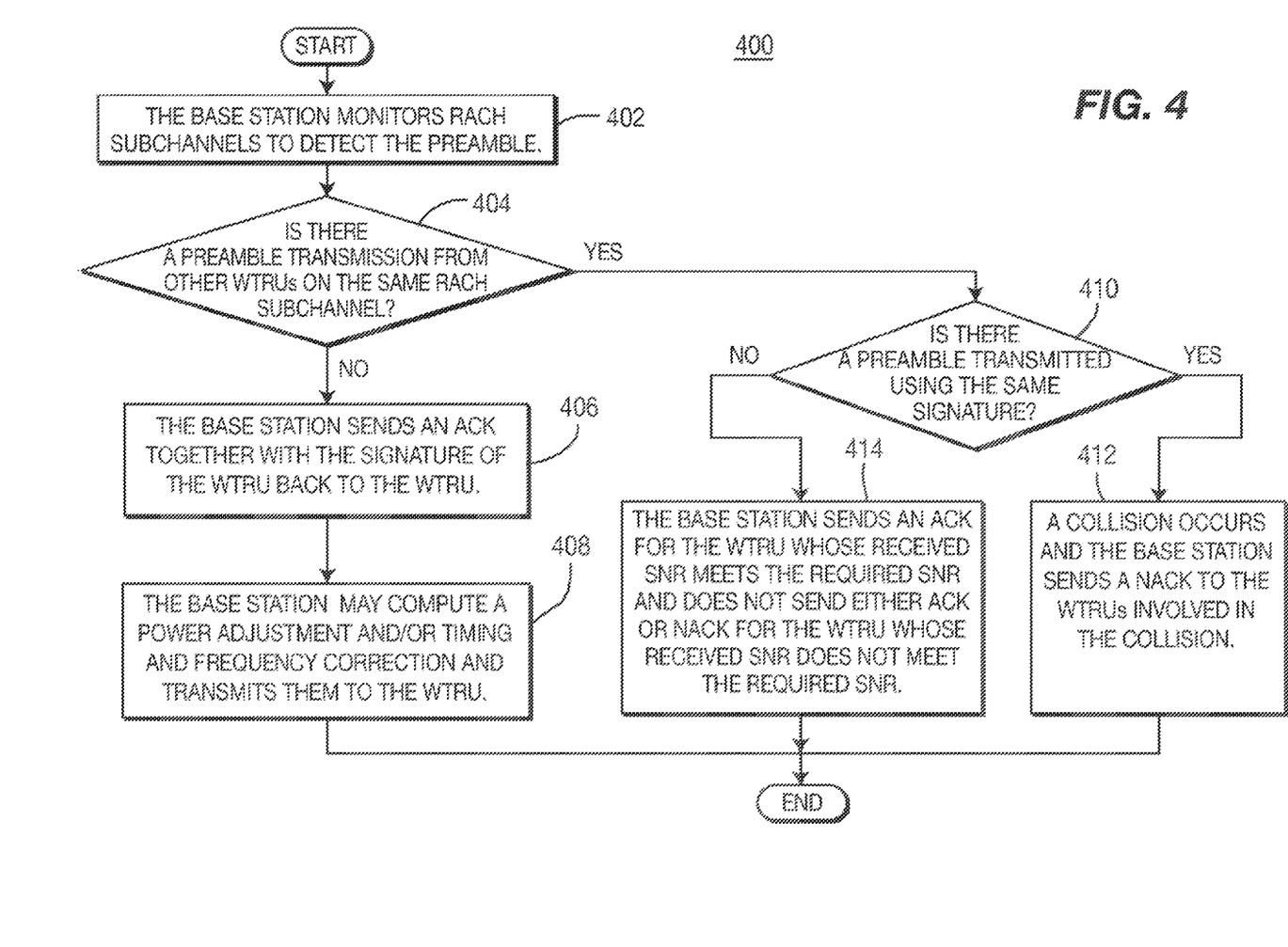
FIG. 4 is a flow diagram of a process for processing the preamble in a base station in accordance with the present invention.

FIG. 4 is a flow diagram of a process 400 for processing the preamble in a base station in accordance with the present invention. The base station monitors RACH subchannels to detect the preamble (step 402). The base station determines whether there is a preamble transmission from other WTRUs on the same RACH subchannel (step 404).

If there is no preamble transmission from other WTRUs on the RACH subchannel used by the WTRU, the received SNR at the base station is likely to be high enough to allow the base station to successfully decode the preamble. After successfully decoding the preamble, the base station sends an ACK together with the signature of the WTRU back to the WTRU (step 406). Bit-wise multiplication of the ACK with the signature may be performed as in the conventional WCDMA system.

The base station may optionally compute a timing and frequency correction and transmits them to the WTRU (step 408). Optionally, a power adjustment may also be computed and signaled to the WTRU. The base station computes the difference between the received SNR and the SNR threshold that is required for successful decoding to compute the power adjustment for the WTRU, (i.e., transmit power reduction for the transmission of the subsequent message part of the WTRU). The power adjustment $P_{adjust}$ is preferably computed as follows:

$$P_{adjust} = \max(SNR_{received} - SNR_{required} - \text{Margin}, 0); \quad \text{Equation (1)}$$

where Margin is a design parameter. All the parameters in Equation (1) are in the units of dB. The power adjustment may be implicitly carried in resource allocation information in Node B's response to the preamble.

Because SC-FDMA is more sensitive to the timing and frequency synchronization errors than a conventional WCDMA system, the base station may process the preamble and derive the timing and frequency correction for the WTRU, and transmit them to the WTRU along with the AI.

If it is determined at step 404 that there is at least one preamble transmitted by other WTRUs on the same RACH subchannel, it is further determined whether there is a preamble transmitted using the same signature (step 410). If there is at least one preamble transmitted using the same signature, a collision occurs and the base station sends a NACK to the WTRUs involved in the collision, (i.e., sends a NACK for the signature) (step 412). The base station may transmit the NACK with the signature. For example, bit-wise multiplication of the NACK with the signature may be performed as in the conventional WCDMA system.

If it is determined at step 410 that there is no preamble transmitted using the same signature, the received SNR may or may not meet the required SNR for successful decoding due to the near far problem or interference caused by cross-correlation between signatures. The base station generates an ACK for the WTRU whose received SNR meets the required SNR, (i.e., ACK for the signature used by the WTRU), and does not generate either an ACK or a NACK for the WTRU whose received SNR does not meet the required SNR (step 414). The base station may compute the power adjustment and the timing and frequency correction for the WTRU whose received SNR meets the required SNR.

Figure 5:
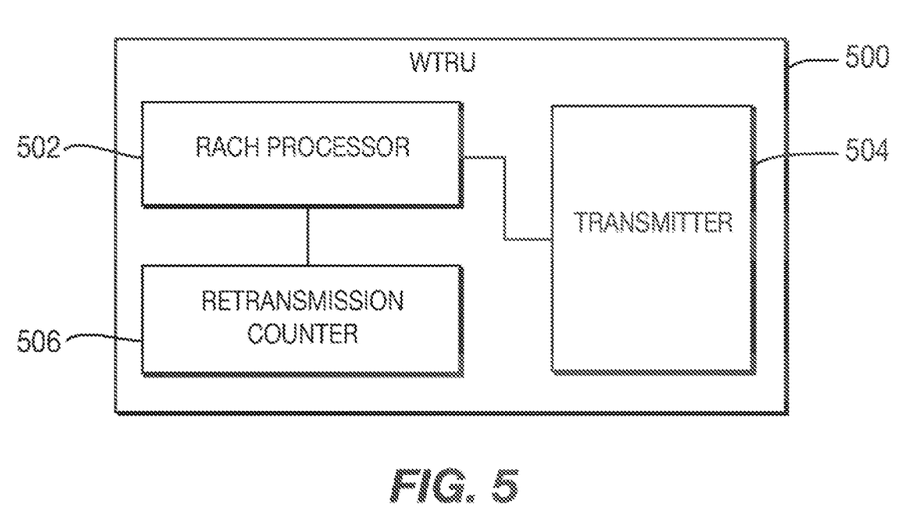
FIG. 5 is a block diagram of a WTRU which implements the process of FIG. 3.

FIG. 5 is a block diagram of a WTRU 500 which implements the process of FIG. 3. The WTRU 500 includes a RACH processor 502 and a transmitter 504. The RACH processor 502 is configured to randomly select a RACH subchannel among a plurality of available RACH subchannels and a signature among a plurality of available signatures. The transmitter 504 is configured to transmit a preamble using the selected signature via the selected RACH subchannel at a predetermined or computed transmission power level. The WTRU 500 may include a retransmission counter 506. The retransmission counter 506 is for tracking the number of retransmissions of the preamble. The retransmission counter 506 is initialized at transmission of a new preamble and incremented each time the preamble is retransmitted. The transmitter 504 transmits the preamble only if the retransmission counter 506 does not exceed a retransmission limit.

Figure 6:
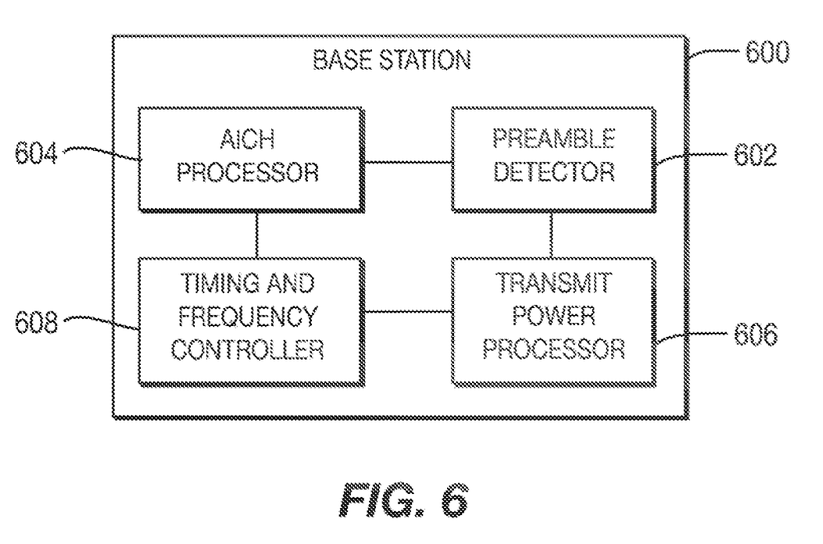
FIG. 6 is a block diagram of a base station which implements the process of FIG. 4.

FIG. 6 is a block diagram of a base station 600 which implements the process of FIG. 4. The base station 600 includes a preamble detector 602 and an AICH processor 604. The preamble detector 602 is configured to detect a preamble transmitted by a WTRU on a RACH. The AICH processor 604 is configured to send an AI to the WTRU when a preamble is detected on the RACH. The base station 600 may also include a transmit power controller 606 and/or a timing and frequency controller 608. The preamble detector 602 determines whether there is a preamble transmitted by another WTRU on the selected RACH subchannel and the AICH processor 604 sends an ACK if there is no preamble transmitted by another WTRU on the selected RACH subchannel.

The transmit power controller 606 is configured to compute a power adjustment based on a received power level of the preamble. The AICH processor 604 sends the power adjustment to the WTRU along with the AI to adjust the transmit power level of the message part. The timing and frequency controller 608 is configured to compute a timing and frequency correction based on the preamble. The AICH processor 604 sends the timing and frequency correction to the WTRU along with the AI to adjust timing and frequency.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
   a processor and a transmitter configured to:
   perform a cell search;
   obtain control information in response to the cell search;
   establish a preamble transmission power level used to transmit a random access preamble over a Random Access Channel (RACH);
   transmit the random access preamble using single carrier frequency division multiple access (SC-FDMA) in accordance with the obtained control information over the RACH on a set of consecutive resource blocks carrying the RACH;
   monitor for a received response to the random access preamble, which includes at least a resource allocation; and transmit a random access message including an identifier of the WTRU using the SC-FDMA utilizing resources derived from at least the resource allocation.

2. The WTRU of claim 1, wherein:
the processor, which is configured to monitor for the resource allocation, further monitors for a timing advance; and
the transmitter is configured to transmit the random access message with a timing derived from the timing advance.

3. The WTRU of claim 1, wherein:
the processor, which is configured to monitor for the resource allocation, further monitors for a power command; and
the transmitter is configured to transmit the random access message with a transmission power level derived from the power command.

4. A method implemented by a wireless transmit/receive unit (WTRU), the method comprising:
performing a cell search;
obtaining control information in response to the cell search;
establishing a preamble transmission power level used to transmit a random access preamble over a Random Access Channel (RACH);
transmitting the random access preamble, using single carrier frequency division multiple access (SC-FDMA) in accordance with the obtained control information over the RACH on a set of consecutive resource blocks carrying the RACH;
monitoring for a received response to the random access preamble, which includes at least a resource allocation; and
transmitting a random access message including an identifier of the WTRU, using the SC-FDMA utilizing resources derived from at least the resource allocation.

5. The method of claim 4, wherein:
the monitoring for the received response includes monitoring for a timing advance in the received response; and
the transmitting of the random access message includes transmitting the random access message with a timing derived from the timing advance.

6. The method of claim 4, wherein:
the monitoring for the received response includes monitoring for a power command in the received response; and
the transmitting of the random access message includes transmitting the random access message with a transmission power level derived from the power command.

* * * * *